(12) United States Patent
Eda et al.

(10) Patent No.: US 10,708,340 B2
(45) Date of Patent: Jul. 7, 2020

(54) METHODS AND SYSTEMS FOR IMPROVING EFFICIENCY IN DATA TRANSFERS

(71) Applicant: INTERNATIONAL BUSINESS MACHINES CORPORATION, Armonk, NY (US)

(72) Inventors: Sasikanth Eda, Vijayawada (IN); Akshat Mithal, Pune (IN); Sandeep Patil, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 78 days.

(21) Appl. No.: 15/826,913

(22) Filed: Nov. 30, 2017

(65) Prior Publication Data

US 2019/0166185 A1 May 30, 2019

(51) Int. Cl.
*G06F 15/16* (2006.01)
*H04L 29/08* (2006.01)
*H04L 5/14* (2006.01)

(52) U.S. Cl.
CPC .............. *H04L 67/06* (2013.01); *H04L 5/14* (2013.01); *H04L 67/10* (2013.01)

(58) Field of Classification Search
CPC .................................. H04L 67/06; H04L 5/14
USPC ....................................................... 709/217
See application file for complete search history.

(56) References Cited

U.S. PATENT DOCUMENTS

| | | | |
|---|---|---|---|
| 6,249,764 B1* | 6/2001 | Kamae | G06F 16/9558 704/270.1 |
| 10,327,213 B1* | 6/2019 | Han | H04L 25/025 |
| 2007/0086724 A1* | 4/2007 | Grady | H04N 21/4147 386/230 |
| 2010/0274983 A1 | 10/2010 | Murphy et al. | |
| 2012/0233228 A1* | 9/2012 | Barton | H04L 67/06 707/827 |
| 2014/0250066 A1* | 9/2014 | Calkowski | H04L 67/06 707/624 |
| 2014/0359059 A1 | 12/2014 | Gimpl et al. | |
| 2014/0372533 A1 | 12/2014 | Fu et al. | |
| 2015/0012495 A1 | 1/2015 | Prahlad et al. | |
| 2015/0161632 A1* | 6/2015 | Humay | G06Q 30/0203 705/7.32 |
| 2018/0041567 A1* | 2/2018 | Kidambi | H04L 67/06 |

* cited by examiner

*Primary Examiner* — SM A Rahman
(74) *Attorney, Agent, or Firm* — Griffiths & Seaton PLLC

(57) ABSTRACT

Embodiments for managing data transfers by one or more processors are described. A signal is caused to be sent between a first computing system and a second computing system. Data is stored on at least one of the first computing system and the second computing system. During at least one first portion of the signal, information associated with the storage of the data on the at least one of the first computing system and the second computing system is transferred between the first computing system and the second computing system. During at least one second portion of the signal, at least some of the data is transferred between the first computing system and the second computing system.

12 Claims, 8 Drawing Sheets

METHODS AND SYSTEMS FOR IMPROVING EFFICIENCY IN DATA TRANSFERS

BACKGROUND OF THE INVENTION

Field of the Invention

The present invention relates in general to computing systems, and more particularly, to various embodiments for improving efficiency in data transfers, such as to and from cloud computing nodes.

Description of the Related Art

In the current day "cloud-as-a-backup-tier" implementations, users are provided with various options with respect to the vendors and storage options for backing up data.

However, current implementations lack several features that may improve operational efficiency, at least in some situations. For example, current day implementations do not offer any sort of control over the life cycle management across different types of storage devices on the cloud vendor end based on, for example, the current status, predicted demands, or operational characteristics of the on-premises (or local) computing system. Current systems also do not provide any sort of automated tuning based on the current status of the cloud storage systems.

SUMMARY OF THE INVENTION

Various embodiments for managing data transfers by one or more processors are described. In one embodiment, by way of example only, a method for managing data transfers, again by one or more processors, is provided. A signal is caused to be sent between a first computing system and a second computing system. Data is stored on at least one of the first computing system and the second computing system. During at least one first portion of the signal, information associated with the storage of the data on the at least one of the first computing system and the second computing system is transferred between the first computing system and the second computing system. During at least one second portion of the signal, at least some of the data is transferred between the first computing system and the second computing system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
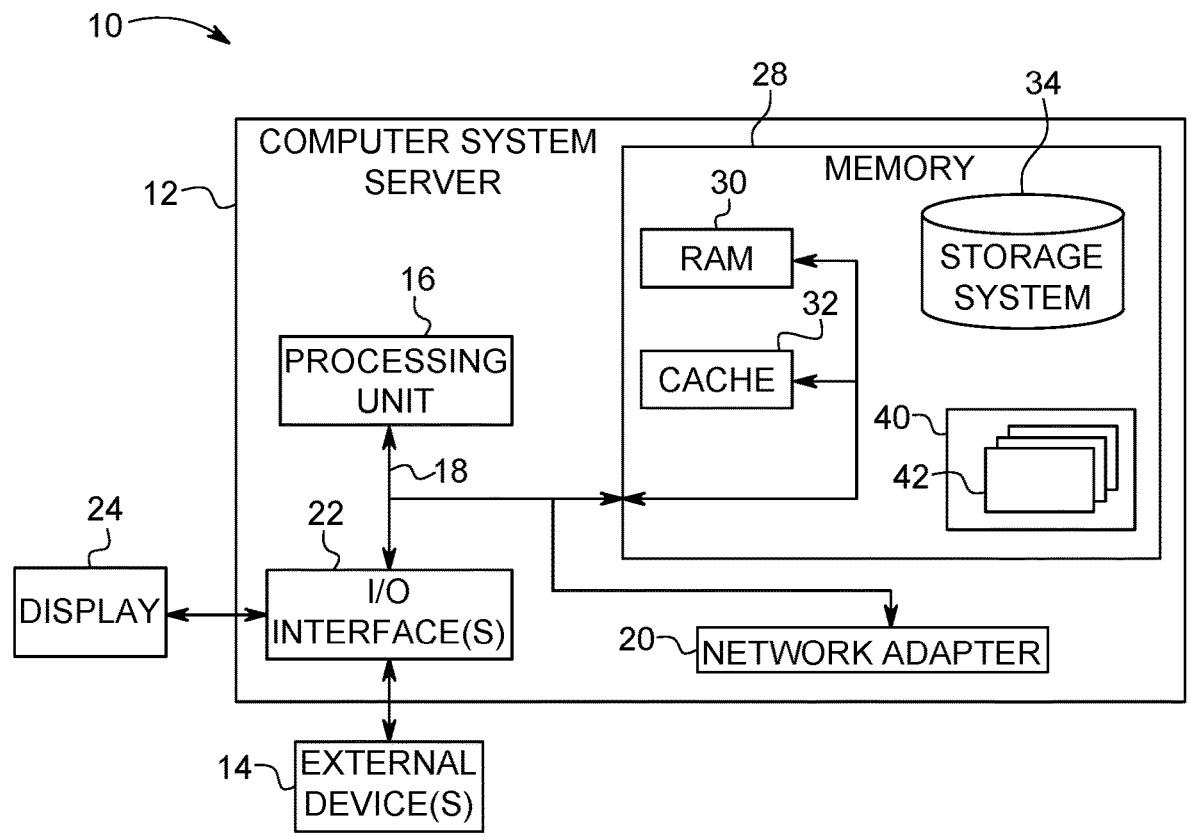
FIG. 1 is a block diagram depicting an exemplary computing node according to an embodiment of the present invention.

As discussed above, users are provided with various options with respect to the vendors and storage options for backing up data in current "cloud-as-a-backup tier" implementations. However, the current implementations lack several features that may improve operational efficiency, at least with respect to some situations.

For example, current systems do not offer any sort of control over the life cycle management across different types of storage devices on the cloud vendor end based on, for example, the current status, predicted demands, or operational characteristics of the on-premises (or local) computing system. Current systems also do not provide any sort of automated tuning based on the current status of the cloud storage systems.

Consider a scenario in which the end user has opted to use a cloud vendor that offers or utilizes different types of storage devices with different read/write speeds, latencies, etc. (e.g., a hard disk and a tape drive). Current implementations lack any sort of control of the life cycle management of objects across the different types of storage devices. For example, assume a file residing on the local device is converted to an object and migrated to a tape drive, while an application on the local device has predicted that the object will be needed in the near future (or at least the local device is capable of making such a prediction). Current systems do not have any way to control the life cycle of the object based on, for example, any such prediction, which could be used to, for example, trigger the transfer of the object from the tape drive to the hard disk, which would result in faster access. Rather, in current systems, the user would have to manually request such a movement of the data.

Consider another scenario in which the end user has opted to have some data backed up by a particular cloud storage vendor. Current implementations do not provide any infrastructure for controlling the backup (and/or restore) behavior based on changes that occur with respect to the cloud storage systems. For example, in the event that the cloud storage system experiences outages or other system problems, in order to ensure the data is backed up the end user may have to actively initiate the replication. Similarly, current implementations do not provide any infrastructure for controlling the backup (and/or restore) behavior based on changes that occur to the local computing system or filesystem (e.g., the user's mobile device, desktop PC, etc.). For example, in the event that the local computing system is being utilized by a high priority user and/or is utilizing a high priority application, the user may have to actively tune the parallelization threads to optimize the restoring of data to the local computing system.

In view of the foregoing, there is a need for methods and systems that, for example, provide automatic (or based on scheduler) determining of the lifecycle of objects within cloud storage system storage options, automatic tuning of the backup characteristics based on the current operational characteristics of cloud vendors/datacenters, and/or automatic tuning of the backup characteristics based on the current operational characteristics of on-premise filesystem, as described herein.

To address these needs, embodiments described herein provide methods and systems for managing data transfers in which a "control signal" is sent between (at least two) computing systems, which include (or is representative of) information associated with the storage of data on one or more of the computing systems. For example, in some embodiments, a control signal is automatically sent between a first computing system (e.g., a local/on-premises computing system or filesystem) and a second computing system (e.g., a remote computing system, such as a cloud storage system), which includes information related to, for example, the status, capabilities, demands (e.g., predicted demands), etc. of the computing systems with respect to the storage of data. In some embodiments, the control signal is combined with a "data signal" that includes (or is representative of) data being transferred between the different computing systems. For example, portions of the control signal may be interleaved with portions of the data signal in a time-division duplexed (or time duplexed) manner so that during some portions of the signal sent between the computing systems information related to the storage of the data is passed between the computing systems, while during other portions of the signal, data (e.g., data being stored on at least one of the computing systems) is transferred between the computing systems.

In particular, in some embodiments, a method for managing data transfers by one or more processors is provided. A signal is caused to be sent between a first computing system and a second computing system. Data is stored on at least one of the first computing system and the second computing system. During at least one first portion (or first portions) of the signal, information associated with the storage of the data on the at least one of the first computing system and the second computing system is transferred between the first computing system and the second computing system. During at least one second portion (or second portions) of the signal, at least some of the data is transferred between the first computing system and the second computing system.

The second computing system may be remote from the first computing system. The second computing system may include at least a first type of memory device and a second type of memory device.

The data may (initially) be stored on the first type of memory device within the second computing device, and in response to the transferring of the information associated with the storage of the data on the at least one of the first computing system and the second computing system, the data may be caused to be transferred from the first type of memory device to the second type of memory device within the second computing system.

The information associated with the storage of the data on the at least one of the first computing system and the second computing system may include at least one of a current status of the first computing system or the second computing system and predicted demands of the first computing system or the second computing system.

The signal may be time-division duplexed such that at least some of the first portions of the signal are interleaved with at least some of the second portions of the signal. During the first portions of the signal, substantially none of the data may be transferred between the first computing system and the second computing system, and during the second portions of the signal, substantially no information associated with the storage of the data on the at least one of the first computing system and the second computing system may be transferred between the first computing system and the second computing system.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, computing devices, such as personal computer systems, hand-held or laptop devices, and network PCs/servers, and/or various other devices. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
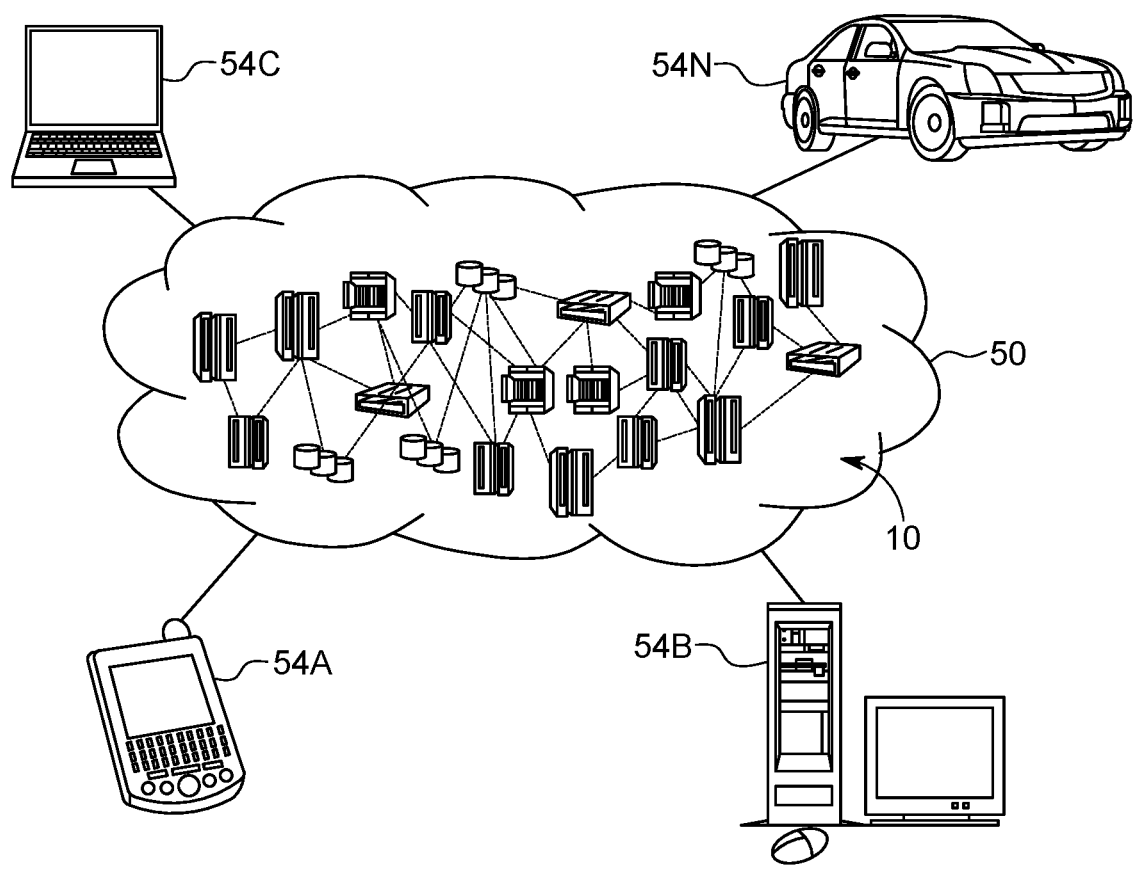
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
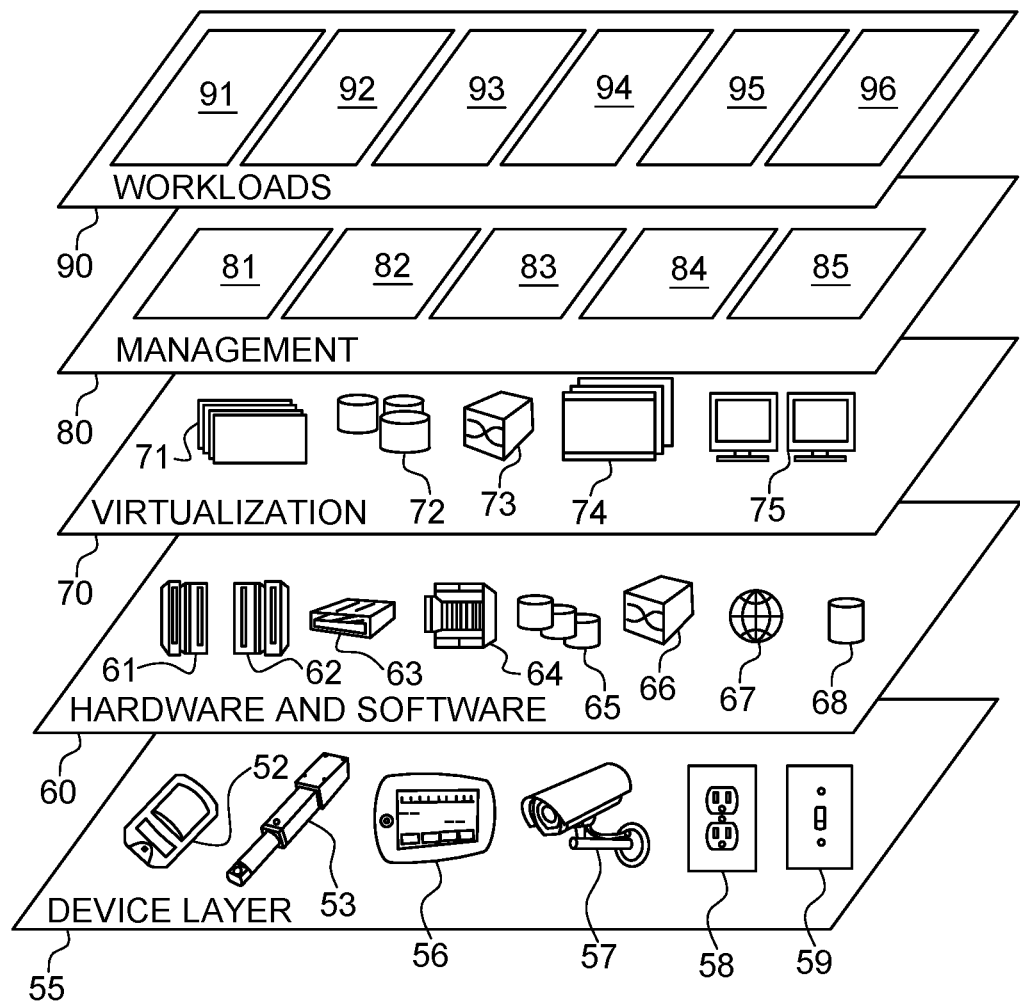
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing data transfers as described herein. One of ordinary skill in the art will appreciate that the workloads and functions 96 for managing data transfers may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for managing data transfers between two or more computing systems. In some embodiments, a "control signal" is sent between (at least two) computing systems. The control signal includes information associated with the storage of data on one or more of the computing systems. For example, a control signal may be automatically sent between a first computing system (e.g., a local/on-premises computing system or filesystem) and a second computing system (e.g., a remote computing system, such as a cloud storage system), which includes information related to, for example, the status, capabilities, demands (e.g., predicted demands), etc. of the computing systems with respect to the storage of data. In some embodiments, the control signal is combined with a "data signal" that includes data being transferred between the different computing systems. Portions of the control signal may be interleaved with portions of the data signal in a time duplexed manner so that during some portions of the signal sent between the computing systems information related to the storage of the data is passed between the computing systems, while during other portions of the signal, data is transferred between the computing systems.

Although portions of the description provided herein may refer to computing systems (and/or components thereof) as, for example, a "local filesystem" and "cloud storage system," it should be understood that the methods and systems of the present embodiments may be applied to any computing environments in which multiple computing systems (and/or storage systems/devices) are in operable communication and data stored on one computing system may be transferred (e.g., backed up) on another computing system within the environment. For example, rather than a local filesystem and cloud storage system, the methods and systems described herein may also be applied to scenarios as simple as a desktop PC and an external hard drive connected via, for example, a USB cable.

Figure 4:
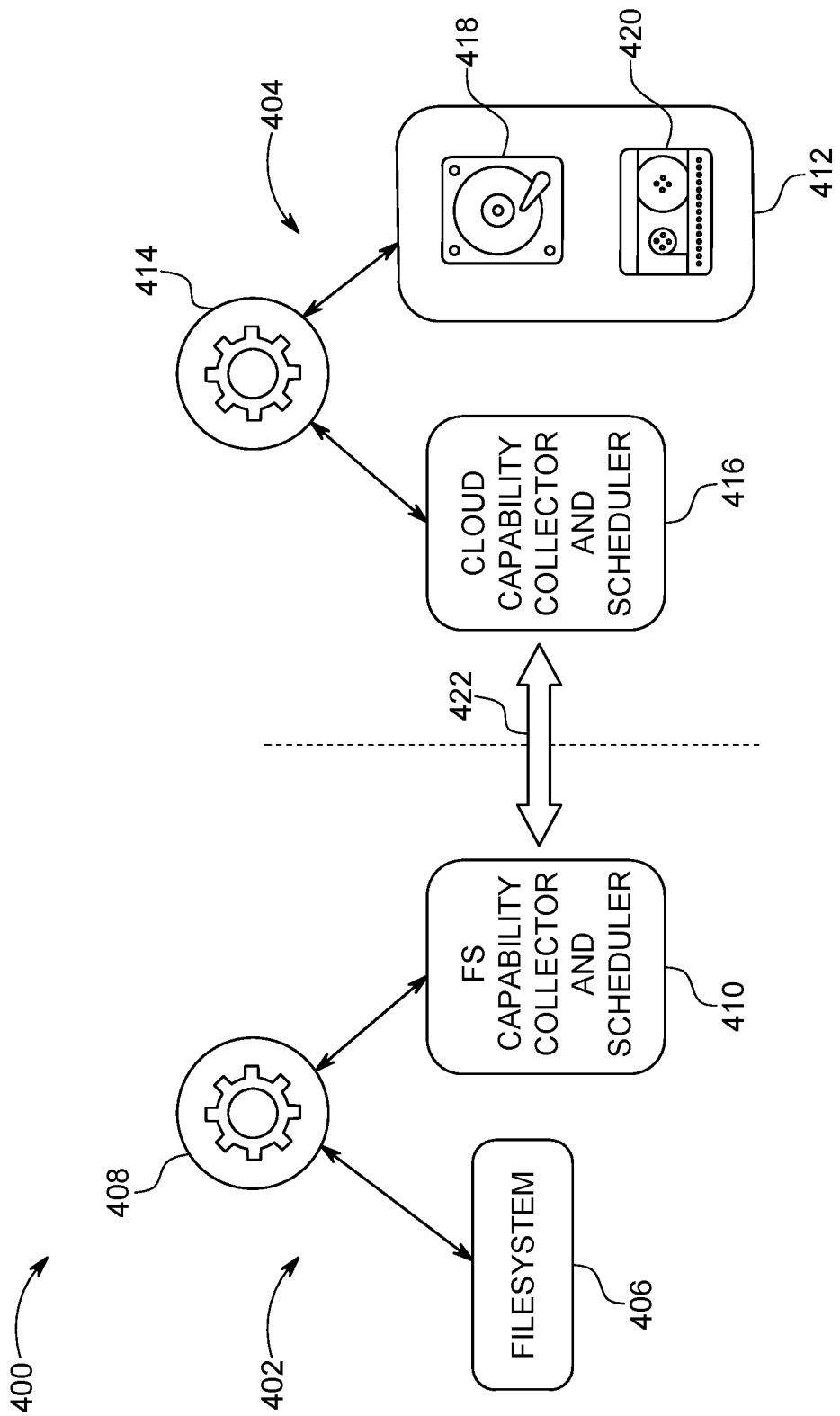
FIG. 4 is a simplified schematic/block diagram of an exemplary computing network according to an embodiment of the present invention.

Referring now to FIG. 4, a simplified schematic/block diagram of an exemplary computing environment (or network) 400 is illustrated. The computing environment 400 includes a first computing system 402 and a second computing system 404. In some embodiments, the first computing system 402 corresponds to a local computing system (or device), and the second computing system 404 corresponds to a remote computing system (e.g., located in a locale different than that of the first computing system 402, etc.). For example, the first computing system 402 may be implemented within a desktop PC, a smart phone, a tablet, etc., and the second computing system 404 may be implemented in a remote computing system, such as a cloud storage system, as is commonly understood. It should be understood that the various components of the first computing system 402 and the second computing system 404 shown in FIG. 4 may only represent a portion of the respective computing systems, as in some embodiments additional components may be included. Further, each of the components shown may be understood to simply represent various aspects of functionality as described herein and may implemented in the various types of hardware (e.g., processors, memories, etc.) described above.

Still referring to FIG. 4, in the depicted embodiment, the first computing system 402 includes a local filesystem (or first storage device/memory/system) 406, a local (or first) policy engine 408, and a filesystem (FS) (or first) capability collector and scheduler 410. The second computing system 404 includes a remote (or second) storage system 412, a remote (or second) policy engine 414, and a remote (or second or cloud) capability collector and scheduler 416.

In the embodiment shown in FIG. 4, the remote storage system 412 includes two types of memory devices: a hard disk (or first type of memory device) 418 and a tape drive (or second type of memory device) 420. As such, in some embodiments, the two different types of memory devices have different "speeds" (e.g., with respect to read/write capabilities, latency, etc.), as will be appreciated by one skilled in the art. Although only one of each type of storage device is shown within the remote storage system 412, it should be understood that in some embodiments, the remote storage system 412 may include more than one of each (e.g., multiple hard disks and/or tape drives), or alternatively, the remote storage system 412 may include only one type of storage device (e.g., a singular device or multiple devices). It should also be noted that in embodiments in which the remote storage system 412 includes multiple storage devices, the storage devices (and perhaps the other components) may be located in different locales, datacenters, etc.

Still referring to FIG. 4, with respect to the embodiments described herein, within the first computing system 402, data may be stored on (or in) the local filesystem 406, while the local policy engine 408 and/or the filesystem capability collector and scheduler 410, for example, manages and/or monitors the storage of the data on the local filesystem 406 along with the overall operation of the first computing system 402, particularly with respect to the storage of the data on the local filesystem 406, as described herein. For example, the filesystem capability collector and scheduler 410 may monitor the filesystem's 406 capabilities (e.g., erasure code scheme changes, compression, deduplication, cloning, encryption, replication, etc.) and collect inputs from cognitive engines related to the prediction of file access.

Similarly, within the second computing system 404, data may be stored on the remote storage system 412 (e.g., on the first type of storage device 418 and/or on the second type of storage device 420), while the remote policy engine 414 and/or the remote capability collector and scheduler 416, for example, manages and/or monitors the storage of the data on the remote storage system 412 along with the overall operation of the second computing system 404, particularly with respect to the storage of the data on the remote storage system 412, as described herein. For example, the remote capability collector and scheduler 416 may monitor the current state of the second computing system 404 and/or the remote storage system 412 (e.g., encryption, replication, compression status, etc.) and monitor storage offerings and/or variations offered by the second computing system 404 (or the organization that administers the second computing system 404, such as a "cloud vendor").

As shown in FIG. 4, in some embodiments, a signal (or "network traffic") 422 is sent between the first computing system 402 and the second computing system 404 (e.g., between the filesystem capability collector and scheduler 410 and the remote capability collector and scheduler 416). In some embodiments, the signal 422 is generated such that for a selected amount of time and/or during some portions of the signal 422, the network bandwidth (or signal 422) is used to transfer "control data" (or a control signal or control I/O) between the first computing system 402 and the second computing system 404, and for a selected amount of time, the network bandwidth is used to transfer "data" (or stored data or a data signal or data I/O) between the first computing system 402 and the second computing system 404.

The control data/signal may include (or represent) information related to the overall operation of the respective computing systems with respect to, for example, the storage of the data within the storage devices (within either computing system), such as current status (e.g., overall health, capabilities, performance, etc.) of the storage devices (e.g., the filesystem 406 and/or the remote storage system 412) or demands (or predicted demands) of either of the computing systems 402 and 404. The data signal may include (or represent) data that is stored within the local filesystem 406 and/or the remote storage system 412 (i.e., either type of storage device within the remote storage system 412). In other words, at certain times, the signal 422 may be used to transfer information related to the storage of the data on the local filesystem 406 and/or the remote storage system 412 and/or the overall status of the respective computing systems 402 and 404 (control I/O), while at other times, the signal 422 may be used to transfer data between the first computing system 402 and the second computing system 404 (data I/O) (e.g., to transfer data stored on the local filesystem 406 to the remote storage system 412 or vice versa).

In some embodiments, based on the information exchanged during the control I/O and/or changes to the control I/O, local policy engine 408 and/or the remote policy engine 414 determines and/or changes the data I/O behavior (e.g., backup, restore, etc.). As one example, based on information received from the first computing system 402 (e.g., a predicted demand for particular data), the remote policy engine 414 may migrate (or replicate) data (e.g., objects or data chunks) across tiers or different storage offerings within the second computing system 404 (e.g., transfer the data from the second type of storage device 420 to the first type of storage device 418) because the information received from the first computing system 402 indicates that the first computing system 402 may request that the data be restored to the filesystem 406 in the near future (i.e., a predicted demand) or because of technical difficulties and/or a security concern at one of the remote storage devices. As another example, based on information received from the second computing system 404 (e.g., availability concern or a potential security issue), the local policy engine 408 may tune the encryption or replication feature of an object (which is about to be migrated or has already been migrated).

In some embodiments, a "state save" with respect to data I/O is provided. For example, the on-going data I/O state may be temporarily stored during the control I/O exchange, and based on the analysis of the control I/O changes, the data I/O may be resumed and related operations, such as backup and/or restore, may be altered in an appropriate manner.

Figure 5:
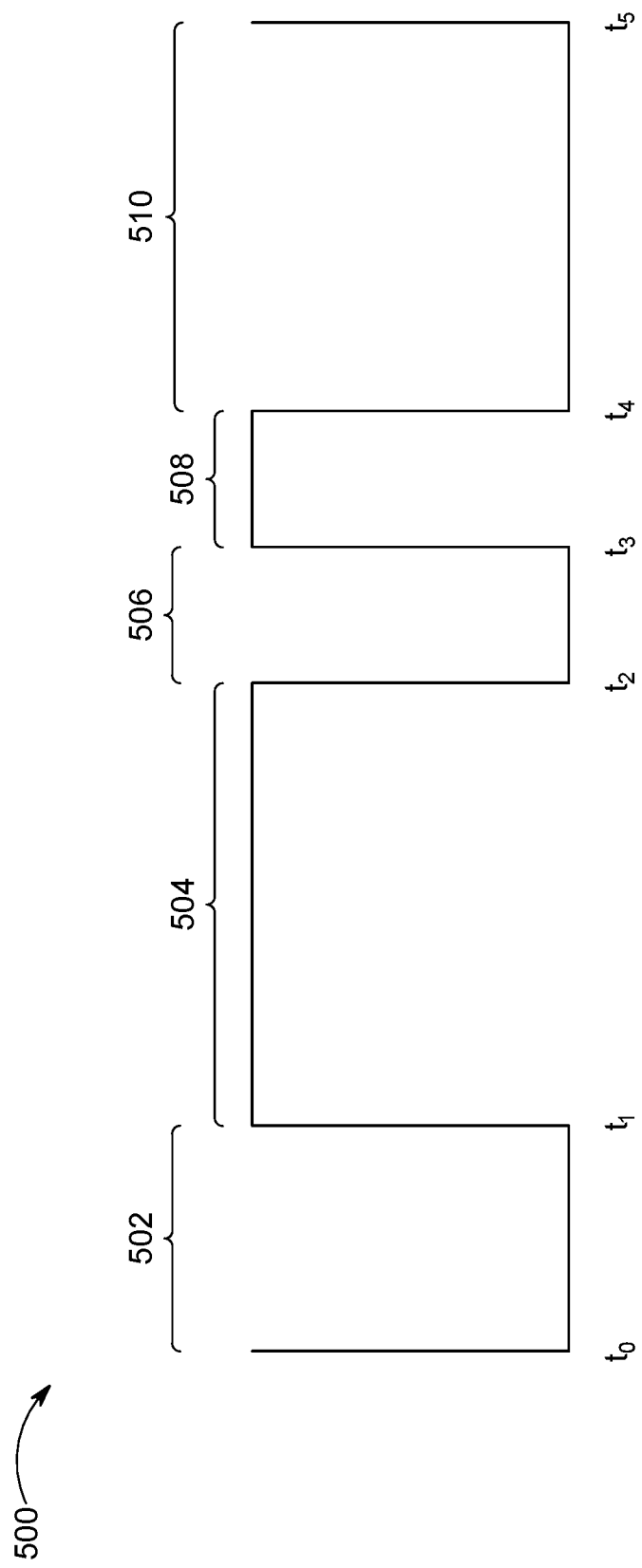
FIG. 5 is an illustrated representation of a signal, or network traffic, according to an embodiment of the present invention.

An example of signal 422 in FIG. 4 is shown in greater detail in FIG. 5, as signal 500. In the embodiment shown in FIG. 5, the signal 500 is a time-division duplexed signal, as is commonly understood, which may be considered to include multiple portions or parts, five of which are shown: 502, 504, 506, 508, and 510 that are separated/divided by times $t_0$, $t_1$, $t_2$, $t_3$, $t_4$, and $t_5$, as shown.

Referring to both FIGS. 4 and 5, as one example, during portion 502 of the signal 500, the first computing system 402 (e.g., the filesystem capability collector and scheduler 410) may send a request to the second computing system 404 (e.g., the remote capability collector and scheduler 416) regarding the capabilities, current status, etc. of the second computing system 404 (e.g., particularly regarding the storage of data within the remote storage system 412). In response, also during portion 502, the second computing system 404 may respond to the first computing system 402 with the requested information.

During portion 504, perhaps in response to the information transmitted during portion 502, the movement of stored data between the first and second computing systems 402 and 404 (e.g., between the filesystem 406 and the remote storage system 412) may be initiated and logically ended. For example, during portion 504, data (or chunks of data) stored on the filesystem 406 may be backed up to (or on) the remote storage system 412 and/or data stored on the remote storage system 412 may be restored to the filesystem 406.

During portion 506, a transfer of information similar to what occurred during portion 502 may be performed, perhaps in reverse. For example, the second computing system 404 (e.g., the remote capability collector and scheduler 416) may send a request to the first computing system 402 (e.g., the filesystem capability collector and scheduler 410) regarding the capabilities, current status, etc. of the first computing system 402 (e.g., particularly regarding the storage of data within the filesystem 406). In response, also during portion 506, the first computing system 402 may respond to the second computing system 404 with the requested information.

Likewise, during portion 508, the movement of stored data between the first and second computing systems 402 and 404 (e.g., between the filesystem 406 and the remote storage system 412) may (again) be initiated and logically ended, perhaps in response to the information transmitted during portion 506 (and/or portion 502). Then, during portion 510, information regarding the capabilities, current status, etc. of the first and second computing systems 402 and 404 may (again) be transmitted in a manner similar to what occurred during portions 502 and 506. Although not shown, the signal 500 may then continue in a similar manner, incorporating additional "control portions" (e.g., portions 502, 506, and 510) and "data portions" (e.g., portions 504 and 508) in an alternating and/or interleaved manner, as described above.

As such, the signal 500 may be used to both transfer information related to the storage of the data on the first and/or second computing system 402 and 404 (i.e., control I/O) and transfer data stored on the first and/or second computing system 402 and 404 between the two computing systems 402 and 404 (i.e., data I/O).

Figure 6:
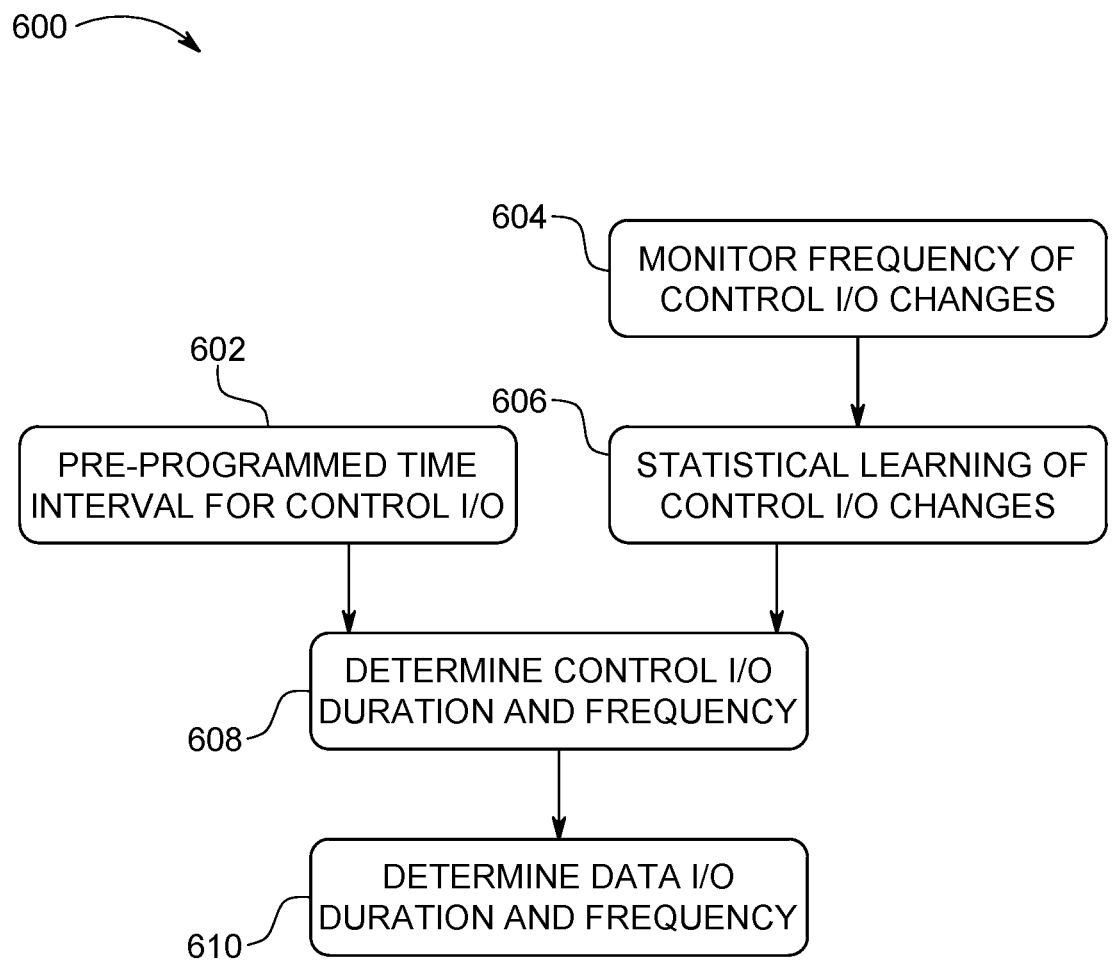
FIG. 6 is a flowchart/functional block diagram of an exemplary method and/or system for determining the frequency of control portions and data portions of a signal, or network traffic, according to an embodiment of the present invention.

In some embodiments, the period and/or frequency of both the control portions of the signal 500 (control I/O) and the data portions of the signal 500 (data I/O) may be, for example, statically set (e.g., by an administrator) and/or dynamically controlled or re-programmed based on various factors (e.g., the capabilities, current status, etc. of the first and second computing systems 402 and 404). For example, FIG. 6 illustrates a flowchart/functional block diagram of an exemplary method and/or system 600 for determining the frequency of the control I/O and data I/O according to some embodiments. The method/system 600 may be implemented within or by, for example, one or both of the remote policy engines 408 and 414 and/or one or both of the capability collectors and schedulers 410 and 416 in FIG. 4. At block 602, a pre-programmed (or statically set) time interval (and/or period and/or frequency) for the control I/O is received (e.g., from an administrator). At blocks 604 and 606, respectively, the frequency of control I/O changes (and/or the changes within the computing system(s) which may result in control I/O changes) are monitored and learned to, for example, determine a new/dynamic control I/O frequency. At block 608, the control I/O duration and frequency (perhaps along with period) are determined by, for example, selecting between the pre-programmed time interval and the new control I/O frequency. At block 610, the data I/O duration and frequency (and perhaps period) is determined, which may be as simple as subtracting the control I/O duration from the total duration of the signal.

Figure 7:
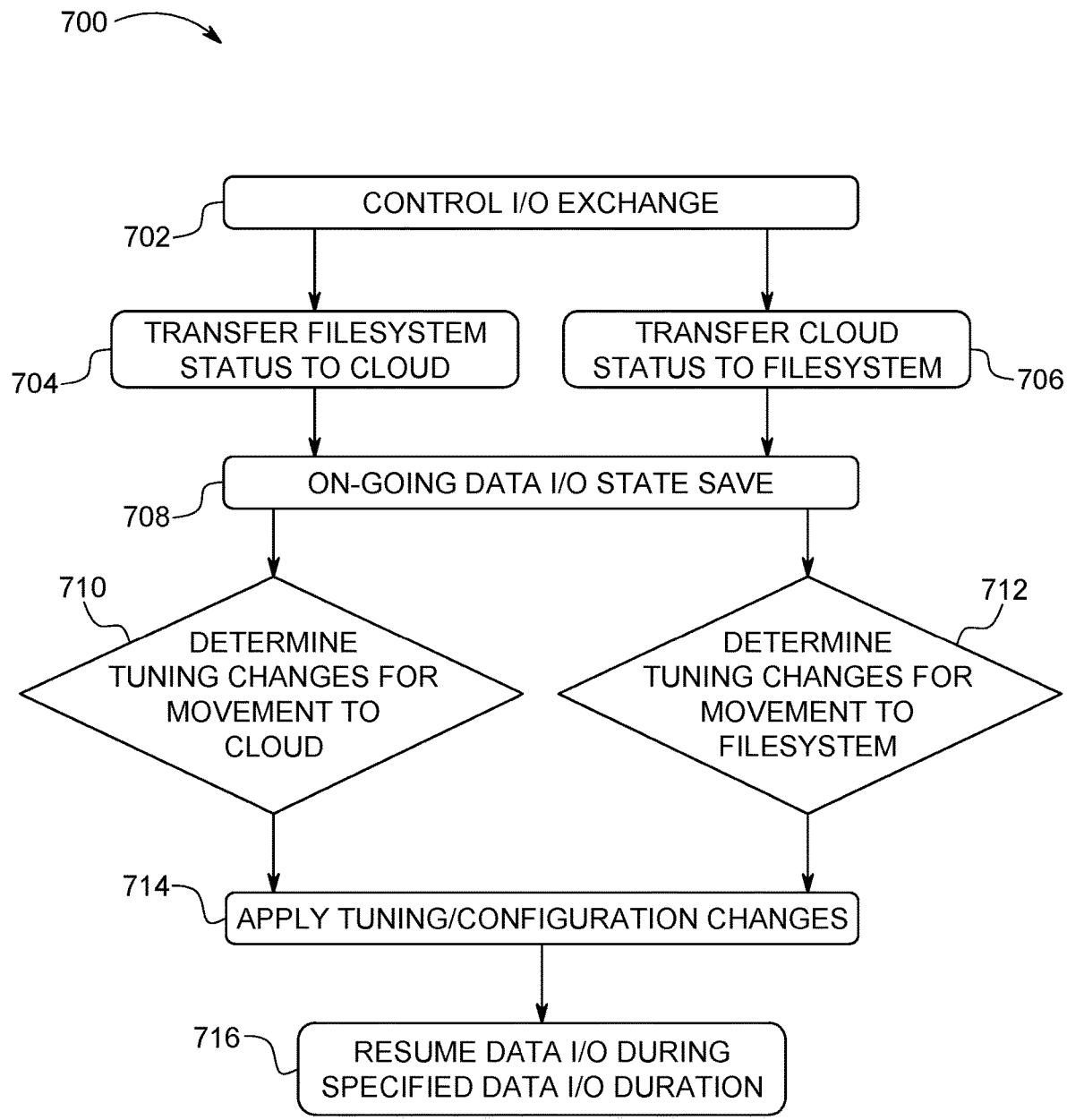
FIG. 7 is a flowchart/functional block diagram of an exemplary method and/or system for improving the efficiency of data transfers between computing systems, according to an embodiment of the present invention.

FIG. 7 illustrates a flowchart/functional block diagram of an exemplary method and/or system 700 for improving the efficiency of data transfers between two computing systems (e.g., a local filesystem and a cloud storage system, as described above) according to some embodiments. The method/system 700 may be implemented within or by, for example, one or both of the remote policy engines 408 and 414 and/or one or both of the capability collectors and schedulers 410 and 416 in FIG. 4. At block 702, a control I/O exchange, as described above, is initiated. At blocks 704 and 706, information related to the status, capabilities, etc. of the filesystem are sent to the cloud storage system and vice versa. At block 708, a state save of the data I/O exchange (i.e., which may have been initiated before block 702) is performed. At blocks 710 and 712, tuning/configuration changes related to the data I/O exchange from the filesystem to the cloud storage system, and vice versa, are determined. At block 714, the changes (e.g., related to data I/O and/or control I/O) are applied. At block 716, data I/O is resumed (or initiated, if not previously performed).

Figure 8:
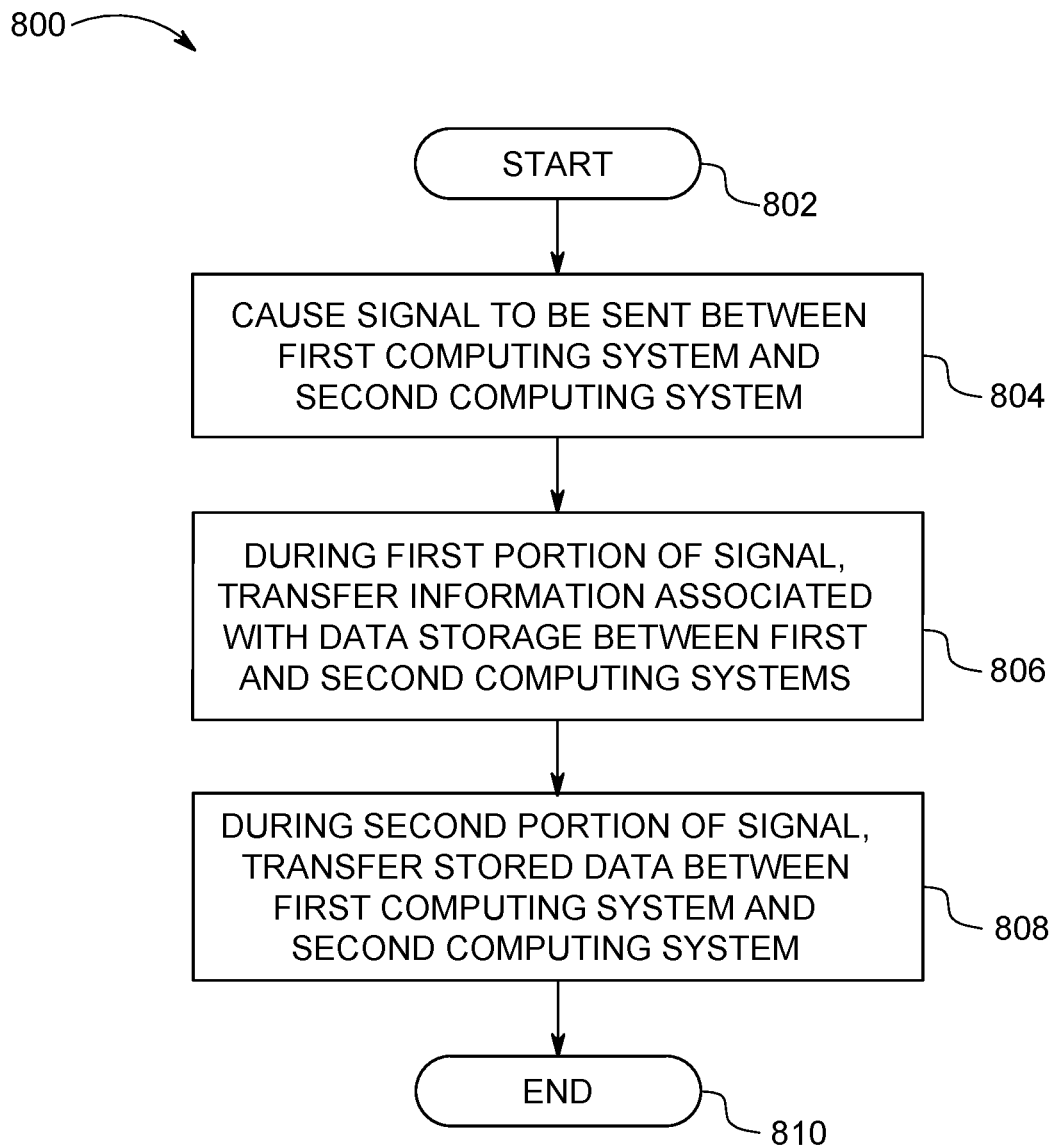
FIG. 8 is a flowchart diagram depicting an exemplary method for managing data transfers, in which various aspects of the present invention may be implemented.

Turning to FIG. 8, a flowchart diagram of an exemplary method 800 for managing data transfers, in accordance with various aspects of the present invention, is provided. Method 800 begins (step 802) with, for example, a first computing system (e.g., a local filesystem) and a second computing system (e.g., a cloud storage system) being placed in operable communication with each other (e.g., via the internet, wi-fi, etc.) and data being stored on at least one of the two systems (and/or on a memory device therein).

A signal is caused to be sent between the first computing system and the second computing system (step 804). During a first portion(s) of the signal, information associated with the storage of the data on the at least one of the first computing system and the second computing system (i.e., control I/O) is transferred between the first computing system and the second computing system (step 806). During a second portion(s) of the signal, at least some of the data is transferred between the first computing system and the second computing system (i.e., data I/O) (step 808).

The second computing system may be remote from the first computing system. The second computing system may include at least a first type of memory device and a second type of memory device. The data may (initially) be stored on the first type of memory device within the second computing device, and in response to the transferring of the information associated with the storage of the data on the at least one of the first computing system and the second computing system, the data may be caused to be transferred from the first type of memory device to the second type of memory device within the second computing system.

The information associated with the storage of the data on the at least one of the first computing system and the second computing system may include at least one of a current status of the first computing system or the second computing system and predicted demands of the first computing system or the second computing system.

The signal may be time-division duplexed such that at least some of the first portions of the signal are interleaved with at least some of the second portions of the signal. During the first portions of the signal, substantially none of the data may be transferred between the first computing system and the second computing system, and during the second portions of the signal, substantially no information associated with the storage of the data on the at least one of the first computing system and the second computing system may be transferred between the first computing system and the second computing system.

Method 800 ends (step 810) with, for example, all of the appropriate data being moved, managed, or undergoing the appropriate operation (e.g., transfer from the first computing system to the second computing system, etc.). Method 800 may then return to step 802 so that the process of exchanging control I/O and/or data I/O may be continued and/or repeated, as described above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing data transfers, comprising:
    causing a data stream to be sent between a first computing system and a second computing system, wherein data is stored on a first type of memory device within the second computing system;
    during at least one first portion of the data stream, transferring a control signal including information associated with the storage of the data on the at least one of the first computing system and the second computing system between the first computing system and the second computing system;
    during at least one second portion of the data stream, transferring a data signal including at least some of the data between the first computing system and the second computing system; wherein the data stream is time-division duplexed, during transmission of the data stream between the first computing system and the second computing system, such that at least some of the at least one first portion of the data stream are interleaved with at least some of the at least one second portion of the data stream; and
    in response to the transferring of the information associated with the storage of the data on the at least one of the first computing system and the second computing system, causing the data to be transferred from the first type of memory device to a second type of memory device within the second computing system.

2. The method of claim 1, wherein the second computing system is remote from the first computing system.

3. The method of claim 1, wherein the information associated with the storage of the data on the at least one of the first computing system and the second computing system includes at least one of a current status of the first computing system or the second computing system and predicted demands of the first computing system or the second computing system.

4. The method of claim 1, wherein during the at least one first portion of the data stream, substantially none of the data is transferred between the first computing system and the second computing system, and wherein during the at least one second portion of the data stream, substantially no information associated with the storage of the data on the at least one of the first computing system and the second computing system is transferred between the first computing system and the second computing system.

5. A system for managing data transfers, comprising:
    at least one processor that
        causes a data stream to be sent between a first computing system and a second computing system, wherein data is stored on on a first type of memory device within the second computing system;
        during at least one first portion of the data stream, transfers a control signal including information associated with the storage of the data on the at least one of the first computing system and the second computing system between the first computing system and the second computing system;

during at least one second portion of the data stream, transfers a data signal including at least some of the data between the first computing system and the second computing system; wherein the data stream is time-division duplexed, during transmission of the data stream between the first computing system and the second computing system, such that at least some of the at least one first portion of the data stream are interleaved with at least some of the at least one second portion of the data stream; and in response to the transferring of the information associated with the storage of the data on the at least one of the first computing system and the second computing system, causes the data to be transferred from the first type of memory device to a second type of memory device within the second computing system.

6. The system of claim 5, wherein the second computing system is remote from the first computing system.

7. The system of claim 5, wherein the information associated with the storage of the data on the at least one of the first computing system and the second computing system includes at least one of a current status of the first computing system or the second computing system and predicted demands of the first computing system or the second computing system.

8. The system of claim 5, wherein during the at least one first portion of the data stream, substantially none of the data is transferred between the first computing system and the second computing system, and wherein during the at least one second portion of the data stream, substantially no information associated with the storage of the data on the at least one of the first computing system and the second computing system is transferred between the first computing system and the second computing system.

9. A computer program product for managing data transfers by one or more processors, the computer program product comprising a non-transitory computer-readable storage medium having computer-readable program code portions stored therein, the computer-readable program code portions comprising:

an executable portion that causes a data stream to be sent between a first computing system and a second computing system, wherein data is stored on on a first type of memory device within the second computing system;

an executable portion that, during at least one first portion of the data stream, transfers a control signal including information associated with the storage of the data on the at least one of the first computing system and the second computing system between the first computing system and the second computing system;

an executable portion that, during at least one second portion of the data stream, transfers a data signal including at least some of the data between the first computing system and the second computing system; wherein the data stream is time-division duplexed, during transmission of the data stream between the first computing system and the second computing system, such that at least some of the at least one first portion of the data stream are interleaved with at least some of the at least one second portion of the data stream; and an executable portion that, in response to the transferring of the information associated with the storage of the data on the at least one of the first computing system and the second computing system, causes the data to be transferred from the first type of memory device to a second type of memory device within the second computing system.

10. The computer program product of claim 9, wherein the second computing system is remote from the first computing system.

11. The computer program product of claim 9, wherein the information associated with the storage of the data on the at least one of the first computing system and the second computing system includes at least one of a current status of the first computing system or the second computing system and predicted demands of the first computing system or the second computing system.

12. The computer program product of claim 9, wherein during the at least one first portion of the data stream, substantially none of the data is transferred between the first computing system and the second computing system, and wherein during the at least one second portion of the data stream, substantially no information associated with the storage of the data on the at least one of the first computing system and the second computing system is transferred between the first computing system and the second computing system.

* * * * *